US006735699B1

United States Patent
Sasaki et al.

(10) Patent No.: US 6,735,699 B1
(45) Date of Patent: May 11, 2004

(54) METHOD AND SYSTEM FOR MONITORING USE OF DIGITAL WORKS

(75) Inventors: Ryuichi Sasaki, 1-33, Shin-ishikawa, Aoba-ku, Yokohama, Kanagawa (JP); Yusuke Mineno, Chiba (JP); Kazuo Washimi, Tokyo (JP)

(73) Assignee: Ryuichi Sasaki, Kanagawa (JP)

( * ) Notice: Subject to any disclaimer, the term of this patent is extended or adjusted under 35 U.S.C. 154(b) by 0 days.

(21) Appl. No.: 09/404,543

(22) Filed: Sep. 24, 1999

(30) Foreign Application Priority Data

Sep. 24, 1998 (JP) .......................................... 10-269551

(51) Int. Cl.⁷ ................................................ H04L 9/00
(52) U.S. Cl. ......................... 713/200; 713/176; 705/59
(58) Field of Search ................................ 713/200, 176; 705/59

(56) References Cited

U.S. PATENT DOCUMENTS

| | | | | |
|---|---|---|---|---|
| 6,003,763 A | * | 12/1999 | Gallagher et al. | 235/379 |
| 6,006,332 A | * | 12/1999 | Rabne et al. | 713/201 |
| 6,049,789 A | * | 4/2000 | Frison et al. | 705/59 |
| 6,076,077 A | * | 6/2000 | Saito | 705/51 |
| 6,112,181 A | * | 8/2000 | Shear et al. | 705/1 |
| 6,141,753 A | * | 10/2000 | Zhao et al. | 713/176 |
| 6,141,754 A | * | 10/2000 | Choy | 713/200 |
| 6,148,333 A | * | 11/2000 | Guedalia et al. | 709/219 |
| 6,226,618 B1 | * | 5/2001 | Downs et al. | 705/1 |
| 6,298,446 B1 | * | 10/2001 | Schreiber et al. | 713/201 |
| 6,381,341 B1 | * | 4/2002 | Rhoads | 382/100 |
| 6,418,421 B1 | * | 7/2002 | Hurtado et al. | 705/54 |
| 6,505,160 B1 | * | 1/2003 | Levy et al. | 704/270 |
| 6,522,769 B1 | * | 2/2003 | Rhoads et al. | 382/100 |

FOREIGN PATENT DOCUMENTS

| | | |
|---|---|---|
| EP | 0864959 A2 | 9/1998 |
| JP | 08-185448 A | 7/1996 |
| JP | 10-254909 A | 9/1998 |

* cited by examiner

*Primary Examiner*—Thomas R. Peeso
*Assistant Examiner*—K Zand
(74) *Attorney, Agent, or Firm*—Sughrue Mion, PLLC

(57) ABSTRACT

A digital work utilization monitoring method and system for preventing illegal use such as unpermitted copying of digital works so that use of the digital works can be monitored by judging whether or not the use is legally permitted and for facilitating a smooth and appropriate circulation of digital works by promoting payments of use fees for use of digital works. A use license is issued on the basis of a permission application for using a digital work and the license is embedded into the digital work by means of a digital watermark. With the license having an identification code of a device used by a user, it is judged whether or not the use of the distributed digital work is legally permitted by monitoring. The license can be issued on condition that a use fee has been paid.

17 Claims, 6 Drawing Sheets

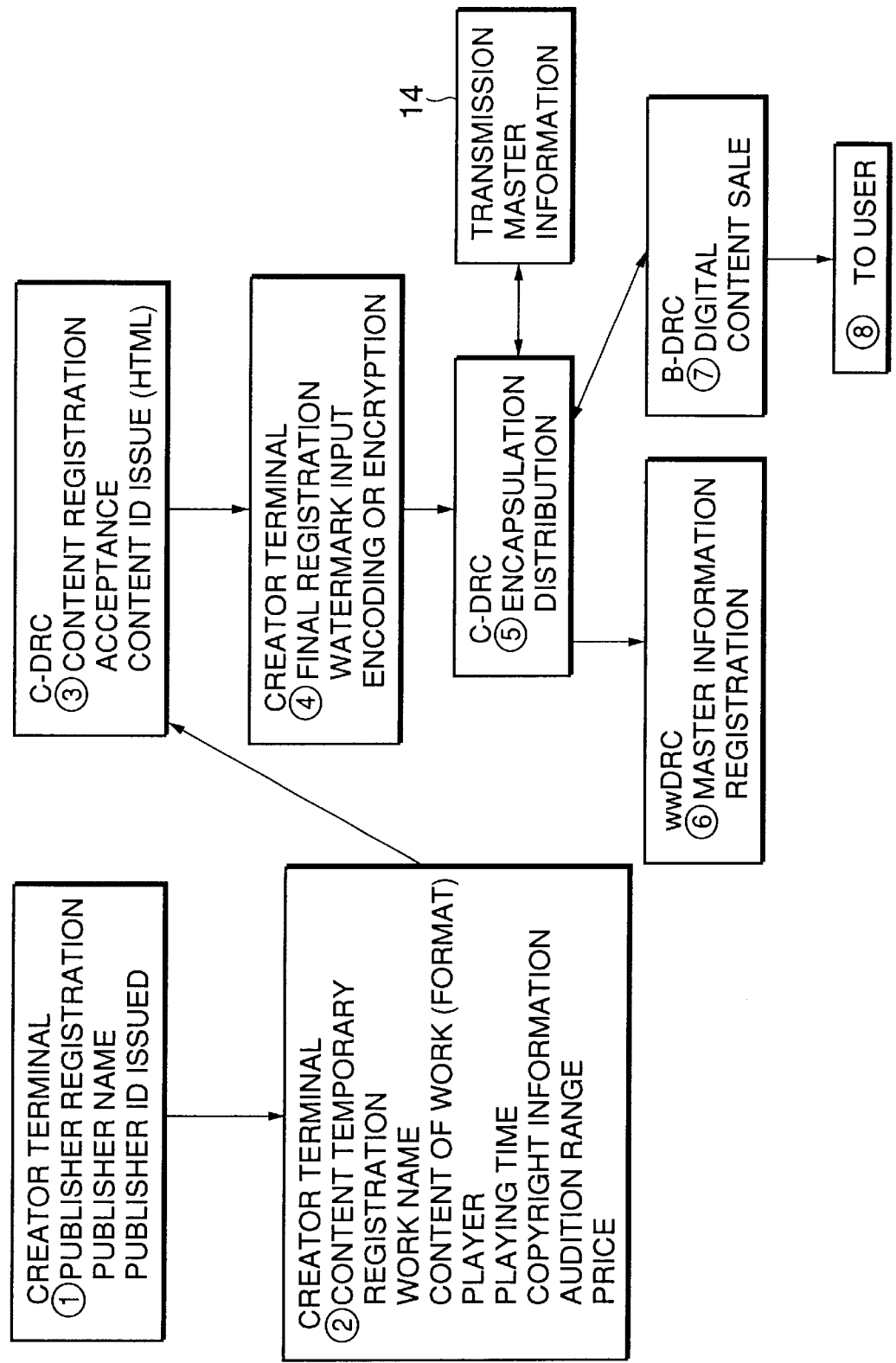

METHOD AND SYSTEM FOR MONITORING USE OF DIGITAL WORKS

BACKGROUND OF THE INVENTION

1. Field of the Invention

The present invention relates to a method and a system for monitoring use of digital works for copyright protection. Particularly, the present invention relates to monitoring method and system of digital works such as digital image or music for preventing inappropriate use thereof when they are reproduced for use and for facilitating an appropriate and smooth distribution of digital works through a computer network or the Internet. The present invention also relates to a digital work recording unit and digital work reproducing unit used in this system.

2. Related Background Art

In recent years, with a development of a digital signal processing technology and a computer technology, various copyright works have been easily digitized at low cost and used popularly. For example, general computer users or an unspecified number of users such as small-scale corporations can create original digital works by themselves in these days. In addition, a vast amount of commercial records, movies, art, craftworks, or architectural works, and books owned by individuals or organizations have been digitized as music software, video software, image software, and publication software, respectively, for use.

These digitized copyright works (called digital works or digital contents) can be easily used by using a personal computer (called PC or simply computer) or a digital equipment. Particularly, via an information network such as the Internet, these digital works can be distributed very easily to individual users and non-profit users. Furthermore, users can copy these digital works or alter them for use very easily.

On the other hand, the conventional copyright law is intended for protecting copyright owners, creators, and distributors on the presupposition that a software quality is degraded by copying a work (if it is image software, for example, an image quality is degraded by copying). In other words, it is used for a proprietor (a creator or an assignee of a copyright) to exercise his or her copyright to make a creator copy it for sale, which brings up and develops record, video, and publication industries or their circulation systems so as to distribute these records, videos, and publications to final users via the circulation systems.

Also in the digital work distribution industry, conventionally a copyright proprietor gives a right of making (copying) a digital package media by means of a CD-ROM or a DVD (a digital video disc or a digital versatile disc) or a right of granting copying on the network to a server which is a distribution enterprise. Therefore, a user of a digital work has accessed to a server having stored masters of digital contents in order to obtain electronic digital copies.

However, in recent years, general individual users or small-scale corporations or organizations can easily purchase commercially available personal computers (PC) or production tool software such as an encoder. Therefore, it becomes possible for the individual users or the small-scale corporations or organizations to create (digitizing or reproducing) contents which has conventionally been created by corporations specializing in a software industry by spending a large amount of techniques and funds.

An individual's use of the contents for his or her own convenience with digital techniques is not an infringement under the conventional copyright law, and therefore it is impossible to take a legal action considering it to be an illegal act. In view of a future development of the digital technology, it is inappropriate to inhibit all of these acts.

Accordingly, it is necessary to establish a new rights protection system for protecting rightful claimants in the age of digital media. Therefore, the applicant of the present invention suggests a new system described below (hereinafter referred to as a digital transfer rights). In other words, this new system actualizes the following:

i) Granting that a user uses a digital work for each user device (a user terminal or a recording and reproducing unit, for example) and giving a license for using the digital work for each user device;

ii) Directly collecting a use fee (registration fee) from the device of the user who has been granted a license for using the digital work; and iii) Distributing the collected use fee to rightful claimants.

SUMMARY OF THE INVENTION

In view of these conditions, the present invention has been provided.

It is a first object of the present invention to provide a digital work utilization monitoring method for facilitating an appropriate and smooth distribution of digital works by making it possible to monitor the digital works to determine whether or not the digital works used by a user have been granted a license for using the digital work in the above new system.

It is a second object of the present invention to provide a utilization monitoring system directly used to perform this method.

It is a third object of the present invention to provide a digital work recording unit which is a component of the utilization monitoring system.

It is a fourth object of the present invention to provide a digital work reproducing unit which is a component of the utilization monitoring system.

In accordance with a first aspect of the present invention, the first object is achieved by a method of monitoring use of digital works, comprising the steps of:

(a) registering a digital work in a rights registration database according to an identification code of the digital work;

(b) receiving an application of permission for a use of the digital work, together with the identification code of the digital work used by a user and an identification code of a user device;

(c) collating the identification code of the digital work and the identification code of the user device with said rights registration database on the basis of the application of the permission for using the digital work and, if the permission for using the digital work is granted, issuing a license including the identification code of the user device; and (d) embedding the license in the digital work by means of a digital watermark so that the user can use the digital work with the license in the user device.

Unless the identification code of the user device is registered for the digital work, it is checked whether or not a fee has been paid from the user device before granting the license. If there is no payment of the fee, preferably a warning is transmitted to the user. To add a license to the digital work, a license issued at every change of a user device can be readily added or written side by side. A renewal of a license, however, is preferable by replacing an old license with a new one in order to prevent a degradation of a quality of the work (an image quality or a sound quality).

The second object is achieved by a system for monitoring use of digital works, comprising:

a rights registration database for registering a digital work and a user device with identification codes, the use device being used by a user for recording and reproducing the digital work;

a user-side encoder, having an application sending section, arranged in the user device, for sending out an application of permission for a use of a digital work with work and device identification codes, the work identification code being an identification code of the digital work used in said user device, and the device identification code being an identification code of said user device, and a license embedding section for embedding a license including said device identification code into the digital work by means of a digital watermark on the basis of a license grant instruction output by a digital rights center described below; and a digital rights center, having an application receiving server for receiving said work and device identification codes from said application sending section and for collating said work and device identification codes with said rights registration database, and a license issuing server for granting the license including said device identification code to said license embedding section if the utilization permission is granted.

It is preferable to provide an accounting system in this utilization monitoring system and to grant a new license on condition that the system has received a payment of a registration fee. In this case, there are provided a payment processing section and an accounting server in the encoder and the digital rights center, respectively. Additionally, an accounting database is provided in the monitoring system. If an identification code of a user is not registered for the applied digital work, the application receiving server requests a final application to the payment processing section. The payment processing section sends the final application to the accounting server and pays the registration fee to the accounting system. Then, the accounting server sends a grant instruction to the license issuing server and the license embedding section embeds the license in the digital work on the basis of the license grant instruction sent from the license issuing server to the user. In this procedure, a result of the processing is stored in the accounting database or the rights registration database.

The user device for recording and reproducing the digital work comprises a computer (a personal computer (PC)), and the computer can be previously connected to the digital rights center via an information network such as the Internet or the WWW (a computer network). If the digital rights center is connected to a large number of users via the information network in this manner, the digital rights center can monitor use of digital works having no license or use of digital works having an identification code of a different user via the information network.

For example, the digital rights center can find out a source of a digital work used in a home page of a user by using a known search engine software to monitor a presence or absence of an appropriate license. If a digital work is used inappropriately or illegally, the digital rights center can send a warning to the user via the information network.

A plurality of digital rights centers (DRCs) may be connected to each other via an information network such as the Internet. In this condition, digital works can be circulated among the DRCs, by which the market can be further expanded. For example, by arranging a digital rights center for an area such as a country, digital works can be freely distributed crossing the barriers of national boundaries between different countries. In this case, accounting processing of each area can be performed within the area in principle.

Preferably the plurality of DRCs are previously classified. For example, they are classified into a supervisory or world wide digital rights center in the highest rank, an area digital rights center in a middle rank, and a terminal digital rights center in the lowest rank. In this condition, a single area digital rights center is arranged for each country so that accounting processing in each country is performed in its area digital rights center while distributions of digital works between different countries and their accounting processing are performed via the world wide digital rights center, which facilitates a smooth distribution of digital works and maintaining an order in addition to facilitating accounting processing between different currencies.

The third object is achieved by a digital work recording unit used for the digital work utilization monitoring system comprising a user-side encoder having the application sending section and the license embedding section, and a recording section for recording a digital work having a license embedded by means of a digital watermark into a detachable storage medium.

The fourth object is achieved by a digital work reproducing unit used together with the digital work recording unit comprising a reproducing section for reading contents recorded in the storage medium and a protector. The protector has a previously stored identification code of the digital work recording unit and inhibits an output of the digital work read by the reproducing section, if the license added to the digital work read by the reproducing section does not match the identification code of the digital work recording unit.

BRIEF DESCRIPTION OF THE DRAWINGS

FIG. 6 is a diagram showing an information flow.

DETAILED DESCRIPTION OF THE PREFERRED EMBODIMENTS

Figure 1:
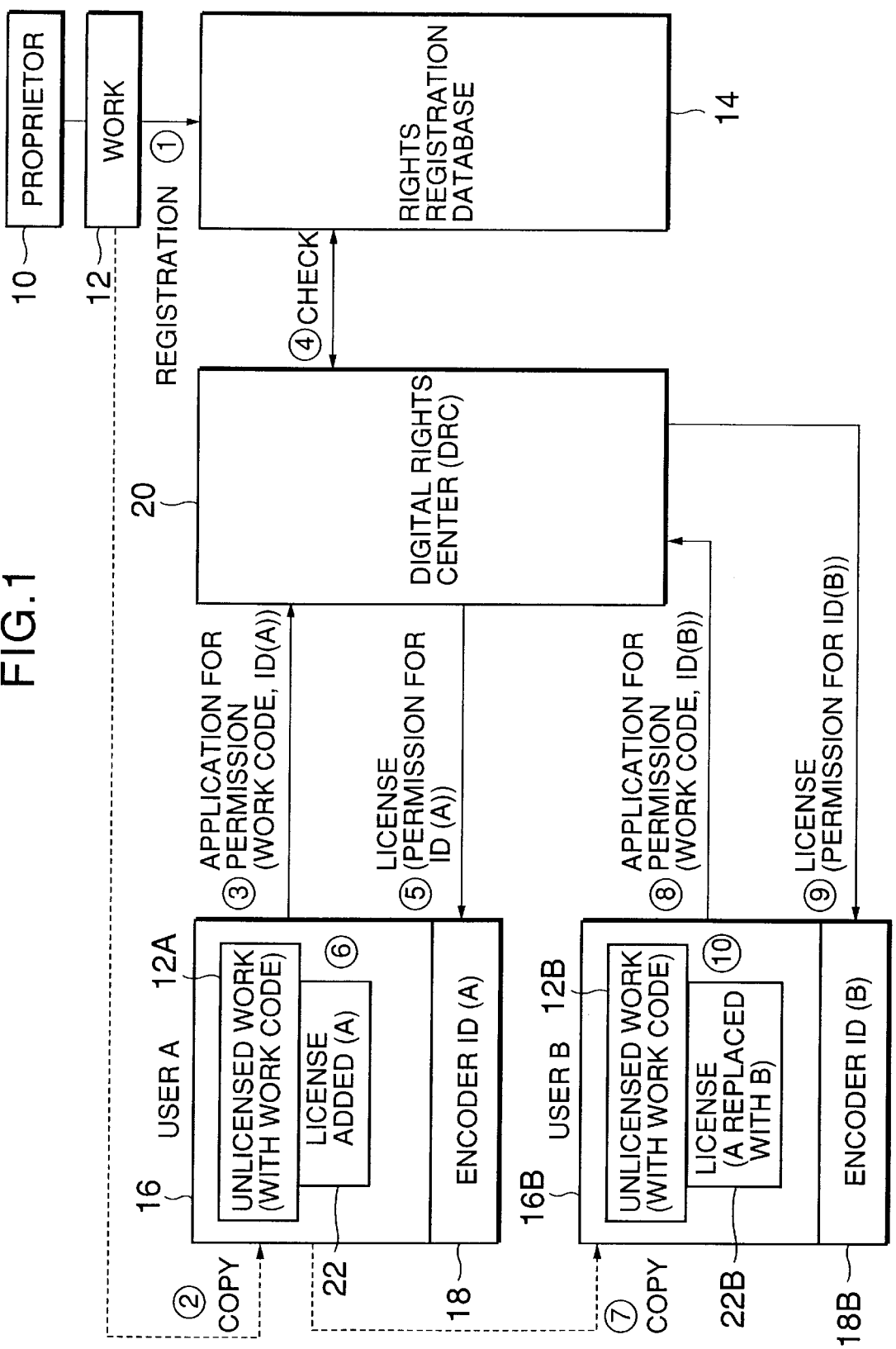
FIG. 1 is a diagram of assistance in explaining a basic constitution of a system for monitoring use of digital works according to the present invention.
Figure 2:
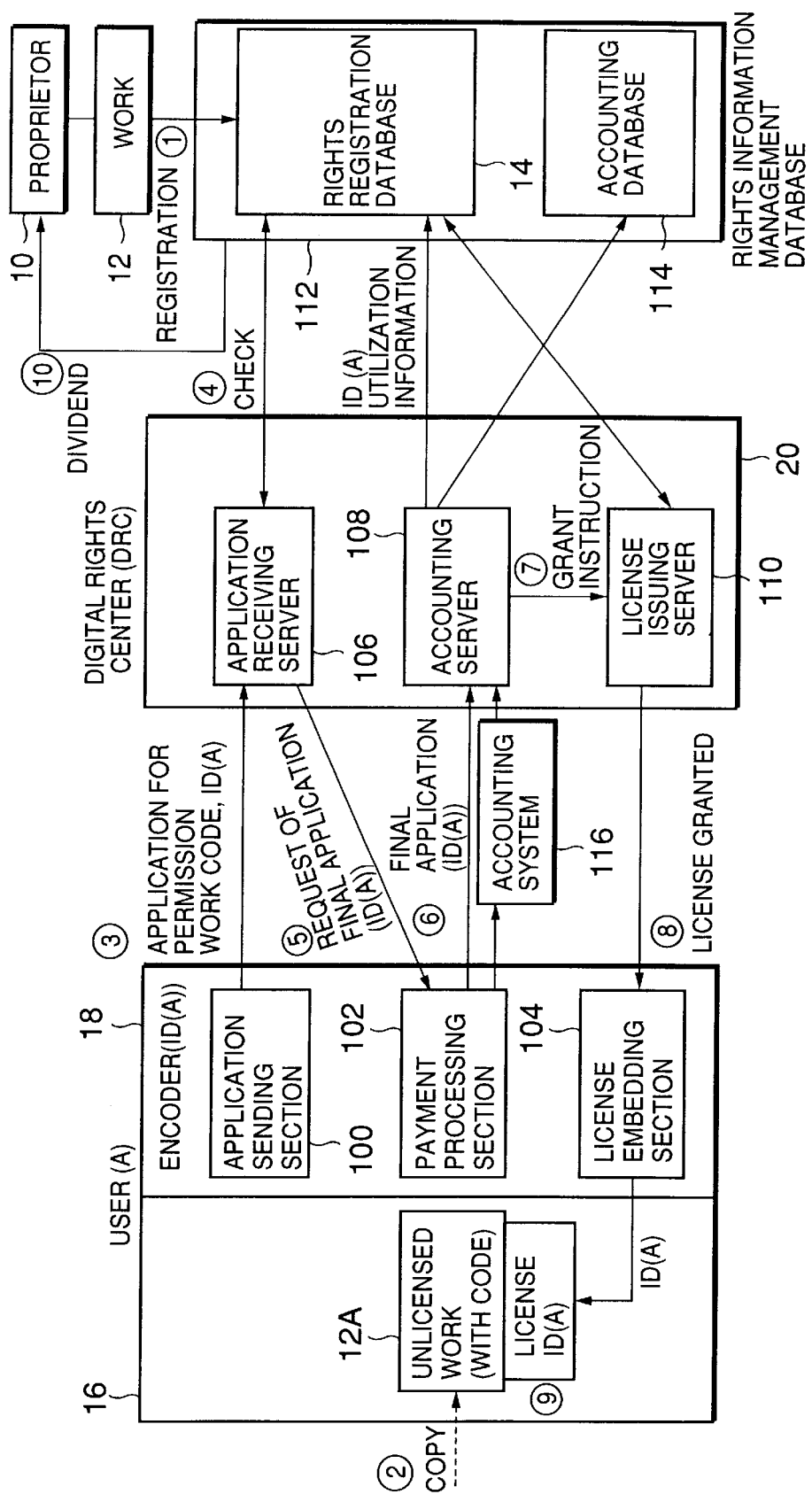
FIG. 2 is a diagram showing an embodiment in which an accounting system is incorporated in the system of the invention.

In FIG. 1, a copyright proprietor 10 (including a creator or an assignee to which a copyright is transferred from the creator) of a digital work 12 registers the digital work 12 in a rights registration database (DB) 14 (Step ① in FIGS. 1 and 2).

All digital works 12 have identification codes, respectively, and a digital work 12 and its identification code are always combined when transmitted. If the digital work 12 is registered in the rights registration database 14, an identification code (ID) of the copyright proprietor 10 is registered together with the identification code (work code) of the digital work 12.

A person who wants to use the digital work 12, in other words, a user A (a user, a client, etc.), who has a user device, i.e., a digital work recording and reproducing unit 16 comprising a computer, copies the digital work 12 to his or her own unit 16 via an information network such as the Internet or via a storage medium such as a CD-ROM or a DVD (Step ②). The copied digital work is stored as an unpermitted or unlicenced digital work 12A in the user device 16.

The recording and reproducing unit 16 of the user A contains an encoder 18 comprising software. The recording and reproducing unit 16 is connected to a digital rights center (DRC) 20 via the information network such as the Internet. The software of the encoder 18 can be supplied from the DRC 20 via the information network. This software can also be recorded in a record medium such as a specially prepared CD-ROM to be supplied to the user A.

The user A who wants to use the digital work 12 applies for a permission for use to the DRC 20 by using the encoder 18 (Step ③). This application is performed by sending an identification code (work ID) of the digital work 12 to be used and an identification code (device ID(A)) of the user A to the DRC 20. When receiving the application for the permission, the DRC 20 collates the identification codes (work ID and device ID(A)) with data in the rights registration database 14 to judge whether or not the user A is registered for the digital work, in other words, whether or not the user A has already been permitted to use the digital work (Step ④).

If the user A has already been permitted, the DRC gives an instruction to grant a license to the user A (Step ⑤). The license grant instruction is limited to the user A and the license 22 includes the identification code ID(A) of e user A. When receiving the license grant instruction, the encoder 18 adds or embeds the license 22 to or in the digital work 12 by means of data hiding technique such as a digital watermark or fingerprinting (Step ⑥). Therefore, the digital work 12 used by the user A is always used with the license 22.

Regarding the digital watermark used in this embodiment, there are various known methods. For example, there have been suggested a method with a Fourier transform or a method with a Wavelet transform for voice data. There have been suggested a method with a Wavelet transform or with JPEG (joint photographic experts group) image compression technology for still images and a method with an MPEG (motion picture image coding experts group) compression technology for dynamic images. A description of these methods is omitted here since their detailed descriptions will complicate the explanation below, and only the following literature names on these methods are described here:

(1) Kineo Matsui, "Image Deep Cryptograph", Morikita Syuppan, 1993;

(2) Hirokazu Ishizuka, Yasuyuki Sakai, Kouichi Sakurai, "Evaluation of Digital Watermarking based on Frequency Transform", The Institute of Electronics, Information and Communication Engineers, Technical Report of IEICE, ISEC97-22, July, 1997; and (3) Keiichi Iwamura, Kouichi Sakurai, Hideki Imai, "Blind Fingerprint", The Institute of Electronics, Information and Communication Engineers, Technical Report of IEICE, ISEC97-35, September, 1997.

Another user B has a user device or recording and reproducing unit 16B like the user A, in which an encoder 18B including an identification code ID(B) of the user B is incorporated. If the user B makes a copy of the digital work 12 from the user A, it is taken into the user device 16B as a digital work 12B (Step ⑦). The encoder 18B of the users code ID(B) sends a work identification code of the digital work 12B and a device identification code ID(B) of the user B to the DRC 20 to apply a permission (Step ⑧). The DRC 20 checks that the user B is permitted to use the digital work 12B by collating the identification codes (work code and device ID(B)) with data in the rights registration database 14 (Step ④). If it is found that his or her utilization permission is registered, the DRC 20 sends a grant instruction of the license 22B to the user B (Step ⑨).

When receiving the grant instruction, the encoder 18B adds the license 22B for the user B to the digital work 12B by embedding a digital watermark (Step ⑩). At this time, the digital work 12B has already had the license 22 of the user A by means of a digital watermark in Step ⑥, and therefore the license 22 can be replaced with the license 22B when the license 22B is added in Step ⑩.

If it is possible to keep constant a quality of image, audio, movie or other information data of the original digital work 12 when the renewal of the license, preferably a repetition of copying will not cause a degradation of an image or audio quality. In addition, the license 22B can also be superimposed on the old license 22 in order so as to be recorded without deleting the old license 22. If this method is used, it is possible to know a history of the copies by reading out the licenses 22B and 22 in a descending order, conveniently to grasp the condition of the use of the digital work 12.

While the user installs the software of the encoder 18 in his or her own recording and reproducing unit 16 in this embodiment, the encoder 18 can be previously installed before the recording and reproducing unit 16 is put on the market or can be previously incorporated in a nonvolatile memory. Particularly, the encoder 18 can be previously installed in all the recording and reproducing units 16 to be put on the market in a manner that a user cannot remove the encoder 18. An application of this constitution improves a monitoring function with an illegal use monitoring system described later with referring to FIG. 3.

Next, a sample constitution in which an accounting system is added to the basic constitution in FIG. 1 will be described below with referring to FIG. 2. In this embodiment, an encoder 18 used for a recording and reproducing unit 16 of a user A comprises an application sending section 100, a payment processing section 102, and a license embedding section 104. The application sending section 100 and the license embedding section 104 are the same as those for the encoder 18 in the embodiment described in FIG. 1.

In addition, in this embodiment in FIG. 2, the DRC 20 has an application accepting or receiving server 106, an accounting server 108, and a license issuing server 110. The application receiving server 106 and the license issuing server 110 are the same as those for the DRC 20 in the embodiment described in FIG. 1. Furthermore, in this embodiment in FIG. 2, there is provided an accounting database 114 which forms a rights information management database 112 with a rights registration database 14. In this accounting database 114, accounting information of each user such as, for example, an amount payable, a payment date, and a method of payment for a digital work 12 which has been used is recorded.

A reference numeral 116 indicates an accounting system. The accounting system 116 can cope with various known settlement methods or systems which can be used in future in addition to an electronic money settlement, a cash card settlement, and Internet service provider (ISP) settlement (a method in which the ISP collects charges by using ISP connection IDs (identification codes)).

In this embodiment, if a creator 10 registers the digital work 12 on the rights registration database 14 (Step ① in FIG. 2) and the user A makes a copy of the digital work 12 (Step ② in FIG. 2), the application sending section 100 of the encoder 18 applies a utilization permission to the application receiving server 106 of the DRC 20 (Step ③). This application receiving server 106 determines whether or not the user A has already been registered to be permitted to use the digital work 12 by reference to the rights registration database 14 (Step ④). The operations in the above are completely the same as for the embodiment in FIG. 1.

In the embodiment in FIG. 2, if a utilization permission to the user A is not registered (he or she is not permitted) in Step ④, the application receiving server 106 performs the processing described below in order to make the user A pay a registration fee to transmit an appropriate license. In other words, the application receiving server 106 requests or invites the payment processing section 102 of the encoder 18 to perform a final application for issuing an appropriate license (Step ⑤). The payment processing section 102 performs the final application with the identification code ID(A) of the user A to the accounting server 108 on the basis of the instruction of the user A (Step ⑥). At this time, the user A pays a use fee by using the accounting system 116.

Upon receipts of the final application and a payment of the fee from the user A, the accounting server 108 sends a license grant instruction to the license issuing server 110 (Step ⑦). At this time, it is added to the rights registration database 14 as utilization information that a license has been issued to the user A. In addition, payment information of the use fee is recorded in the accounting database 114.

The license issuing server 110 sends out the same grant instruction to the license embedding section 104 of the encoder 18 on the basis of the grant instruction (Step ⑧). The license embedding section 104 adds the license 22 including the identification code ID(A) of the user A to the work 12 on the basis of this grant instruction by embedding a digital watermark (Step ⑨). As a result, the work 12 becomes legal having the license 22, by which the user A can use it legally. On the other hand, the rights information management database 112 is used for managing a use fee paid by the user A and for distributing a dividend to the copyright proprietor 10 at an appropriate time (Step ⑩).

Figure 3:
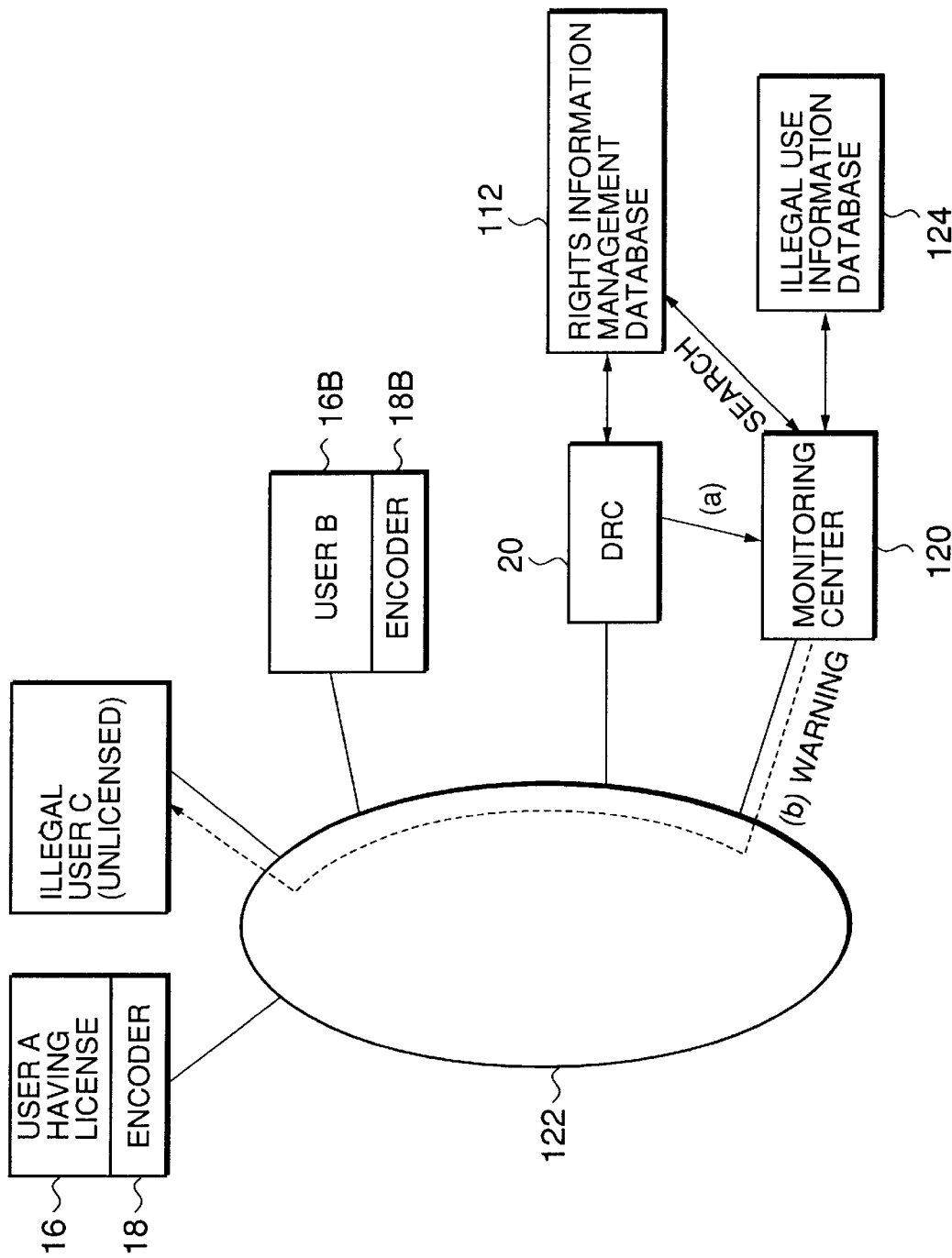
FIG. 3 is a diagram showing an embodiment in which an illegal use monitoring system connected to an information network is incorporated.

Referring to FIG. 3, there is shown another embodiment further having a system for monitoring and warning illegal use. In this embodiment, a plurality of users A, B, C, and after, a digital rights center (DRC) 20, and a monitoring center 120 are connected to each other via an information network 122 such as an Internet. At this point, it is assumed that the users A and B are users of a digital work with a legal license and that the user C is a user who uses a work without a legal license.

The monitoring center 120 sends out a warning to an illegal user and gives an instruction to record information on the illegal user into the illegal use information database 124. In a first method in which the monitoring center 120 finds out an illegal user, the DRC 20 notifies the monitoring center 120 that a user has not paid a use fee although the DRC 20 has received an application for using a work (Step (a) in FIG. 3).

In a second method, the monitoring center 120 searches for illegal use via an information network 122. For example, the monitoring center 120 opens home pages of the users A, B, C, and after at an appropriate time to decipher or decode licenses added by means of digital watermarks to digital works used on the home pages. Then, the monitoring center 120 judges whether or not the deciphered licenses are intended for the users A, B, and after of the works. It judges the user C who uses a digital work with an inappropriate or wrong license or without a license to be an illegal user and sends a warning to the user C via the information network 122 or by other appropriate means (Step (b)).

Figure 4:
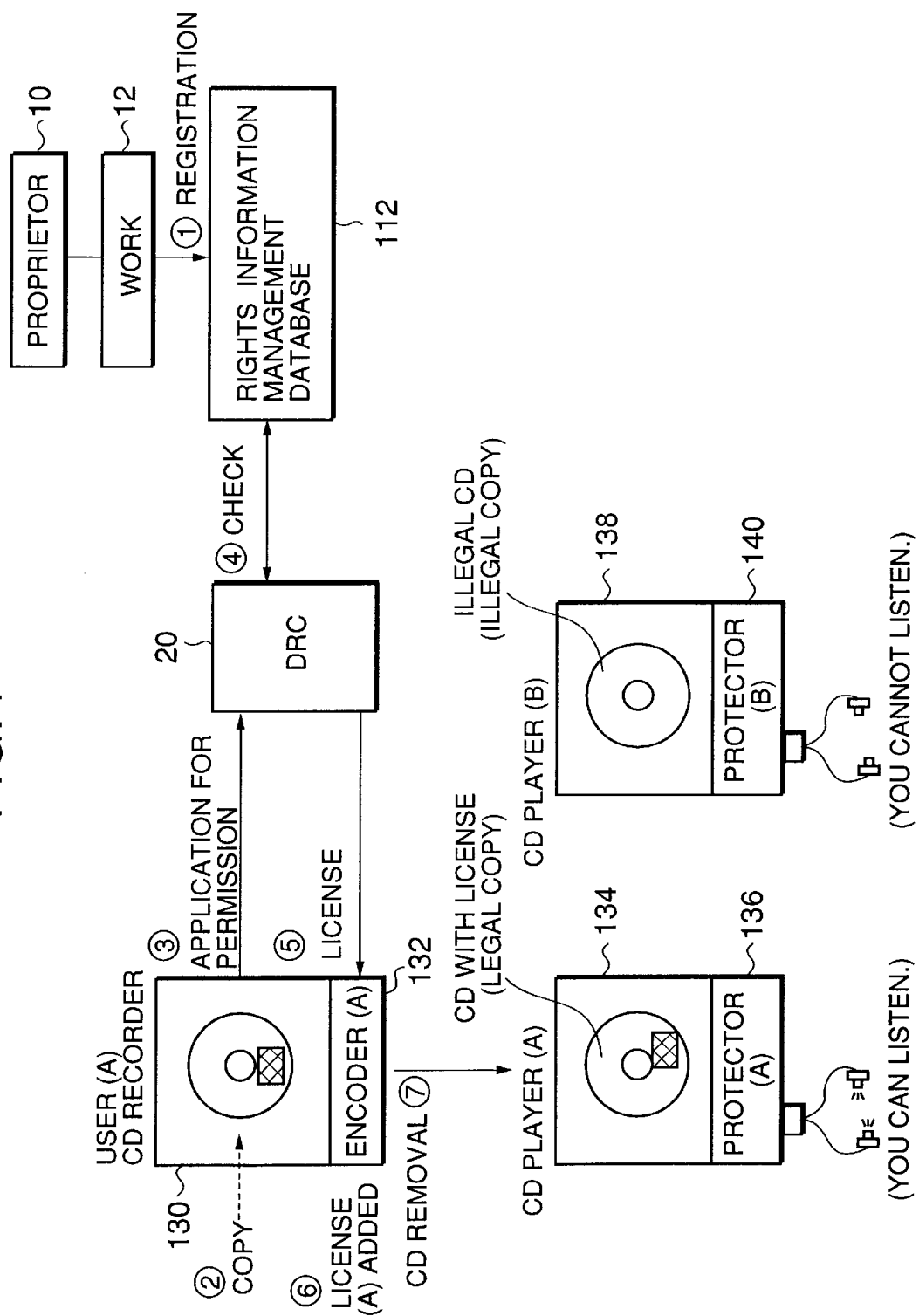
FIG. 4 is a diagram showing another embodiment for restricting illegal use, in which a digital work recording unit is separated from a digital work reproducing unit.

Referring to FIG. 4, there is shown another embodiment for illegal copy protection system. In FIG. 4, a digital work recording unit is separated from a digital work reproducing unit. Reference numeral 130 indicates a recording unit such as a computer, a compact disc (CD) recorder, or a DVD recorder, in which data of a digital work can be recorded as digital information.

An encoder 132 is previously incorporated into the recording unit 130. The encoder 132 includes an identification code ID (A) of a user A of the recording unit 130. If a DRC 20 outputs a license issuing instruction (Step ⑤ in FIG. 4) in response to a permission application of the user A (Step ③), the encoder 132 adds a license (A) for the user A to the digital work by means of a digital watermark (Step ⑥).

A record medium such as, for example, a compact disc (CD) is taken out of the recording unit 130 and set to the reproducing unit (CD player) 134 (Step ⑦ in FIG. 4). The reproducing unit 134 has a previously incorporated protector (A) 136 for the user A. The protector (A) 136 judges whether or not the license is legally issued for the user A by deciphering the license. If the license is intended for the user A, the protector (A) 136 permits a reproduction of the work, by which the user A can listen to music if it is a music work.

A reproducing unit 138 of another user B has a previously incorporated protector (B) 140 for the user B. Accordingly, if a CD having the license for the user A is set to the reproducing unit 138, an identification code ID(B) of the protector (B) 140 does not match an identification ID(A) of the license of the CD. In this case, the protector (B) 140 prohibits a reproduction of the work by the reproducing unit 138. According to this embodiment, an illegally copied digital work cannot be reproduced on a reproducing unit other than a legal reproducing unit, by which illegal copying can be reliably prevented.

Figure 5:
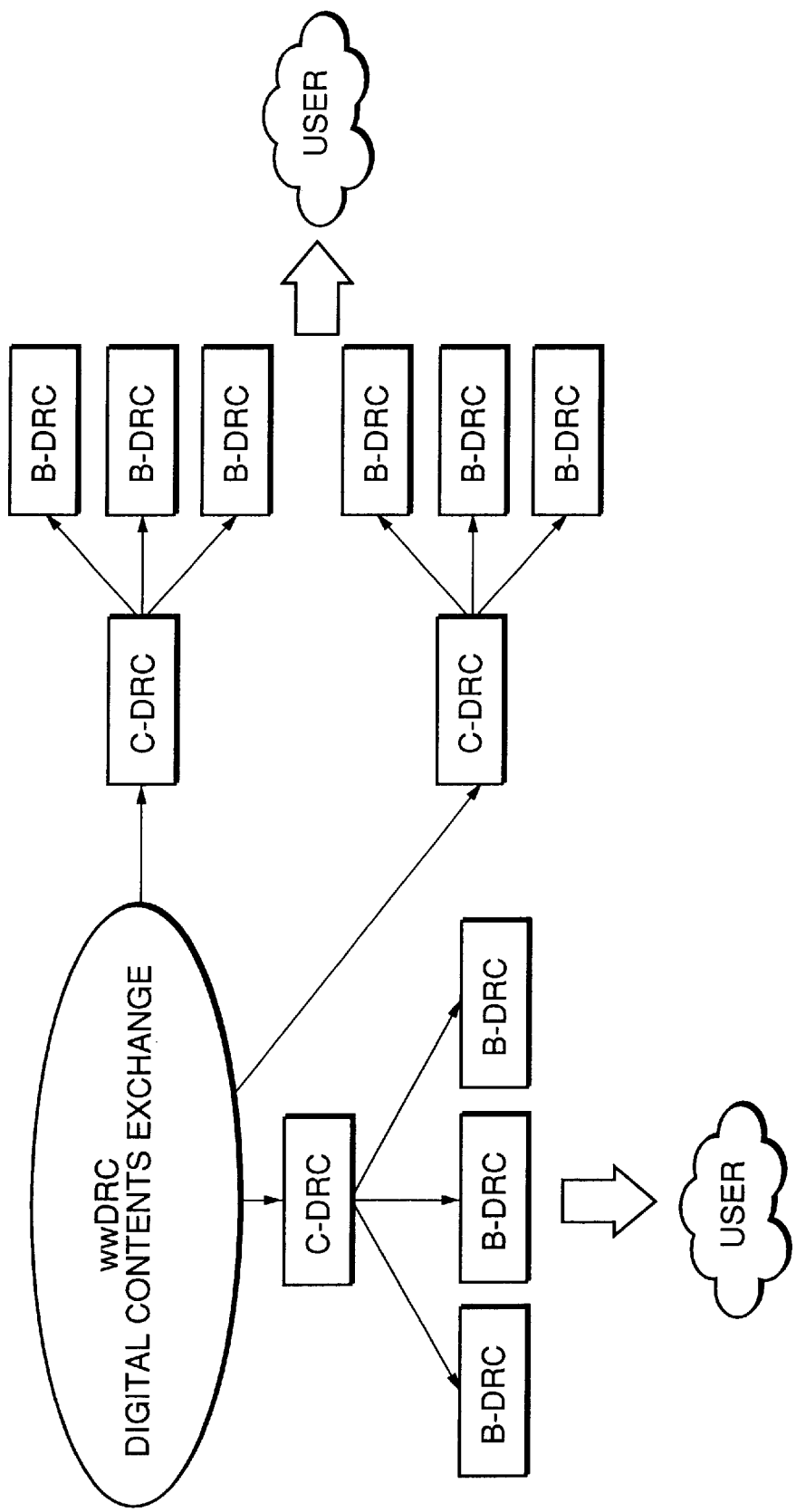
FIG. 5 is a conceptual diagram of another embodiment.

Referring to FIG. 5, there is shown a concept diagram of another embodiment. Referring to FIG. 6, there is shown a diagram of an information flow. In this embodiment, a plurality of the digital rights centers (DRC) described above are hierarchically classified and connected to each other via an information network. More specifically, the DRCs are classified into three; a terminal or business digital rights center (business DRC or B-DRC) for providing a digital work to a user, an area or country digital rights center (country DRC or C-DRC) in a higher rank for administrating a plurality of B-DRCs, and a world wide or supervisory digital rights center (world wide DRC, WW-DRC, or wwDRC) in the highest rank for administrating a plurality of C-DRCs, which are connected via the Internet or the like.

The B-DRC is a distribution management server corresponding to a shop for selling digital works, which can be classified into two types; a large shop and a small shop. The large shop has its own accounting system, while the small shop is a satellite shop which is employed under the control of the large shop or the C-DRC. The B-DRC has the functions of the DRC 20 described in FIGS. 1 and 2 and performs processing such as sales and registration of digital works (contents), a distribution management, a license management, and an accounting settlement information management with a user. While the rights registration database 14 or the accounting database 114 in FIGS. 1 and 2 can be provided to each B-DRC individually, those for the higher C-DRC can be used for the B-DRC. The B-DRC sends information on a transmission of information between the user to the higher C-DRC.

A C-DRC is provided to each area, for example, each country so as to administrate all the B-DRC in each country. This C-DRC has a rights registration database 14 (FIGS. 1 and 2) or a rights information management database 112 (FIG. 2) and an accounting system (116 in FIG. 2) so as to register digital works (contents) in each country and further to perform all the processing and management showing FIGS. 1 and 2. In other words, in each country a single C-DRC manages all digital works and further performs an accounting management and a DRC fee. The C-DRC sends this management information to the highest wwDRC.

The wwDRC is connected to a plurality of C-DRCs to administrate and control C-DRCs each of which is arranged to each country in the world, for example. In this condition, only one wwDRC is provided to the world. The country suitable for a location of the wwDRC is a country where digital works are conveniently managed, for example, a country in which copyright claimants or creators of digital works are most protected from a legal viewpoint such as on an aspect of a copyright or a country where accounting processing among a lot of countries can be most smoothly performed. Although a single C-DRC is preferably arranged in the country having the wwDRC, the wwDRC can be arranged in a country having no C-DRC.

The wwDRC has basically the following three functions; a C-DRC management function, a rights registration exchange function, and an international settlement processing function. The C-DRC management function is used for a system support for the C-DRC arranged in each country and for a data management, in other words, a digital rights processing information management for the C-DRC. For example, it is used to control a distribution of digital works between different C-DRCs. It is also possible to provide the wwDRC with a function of accepting registrations of digital works (contents) and registering them in one of the C-DRCs.

The rights registration exchange function is used to transfer a right regarding a digital work (including a copyright and a reproduction right or other rights attached to a copyright) registered in a C-DRC in each country (domestic registration) to a C-DRC in a country desired by a copyright owner. By this transfer, the right regarding the digital work can be protected by laws of the country to which the right has been transferred. In addition, a use of the rights registration exchange function makes it possible to establish rights related to the digital work between C-DRCs in different countries.

The international settlement processing function is used to manage information on accounting for international transportation of digital works or for establishing or transferring rights and various fees such as license fee and a charge and to make a settlement internationally.

By arranging a C-DRC for each country around the wwDRC so that B-DRCs sell (supply) digital works to users in this manner, the wwDRC can be positioned as an international exchange of digital works. In other words, digital works (contents, that is, commodities) can be sold wholesale to C-DRCs or B-DRCs in the world via the wwDRC. In addition, digital works can be circulated in the world by using a common interface under the control of the wwDRC, by which the management is simplified. Furthermore, creators can obtain a worldwide market via an information network (the Internet), by which digital works can be spread to the world market more easily.

Next, by reference to FIG. 6, a description will be made below for a processing content of a registration of a digital work (content) to a transfer to a user. First, a creator performs a creator registration (a publisher registration) from his or her own computer terminal (a creator terminal). Specifically, the creator registers a creator name (a publisher name) and an identification code ID (a publisher ID) to a C-DRC (Step ① in FIG. 6).

The creator opens a content registration file from his or her own terminal (creator terminal) by using a browser (viewer) and temporally registers a work (content) (Step ② in FIG. 6). For a music work, for example, the creator inputs a work name, a work content (format), a player, a playing time, copyright information, an audition range, and a price (in US dollars, for example). When accepting this temporary registration, the C-DRC issues an identification code for the work (content), that is, a content ID (Step ③ in FIG. 6). This content ID is assumed to be in a hyper text makeup language (HTML), for example.

The creator receives the content ID on the creator terminal and finally registers his or her own digital work at the C-DRC (Step ④ in FIG. 6). In this final registration, various information, for example, an identification mark of the digital work (a publisher name, a publisher ID, etc.) are embedded in the digital work by means of digital watermarks or blind fingerprints. In addition, input information such as a work name inputted in Step ② is appended to the work in an appropriate method. It is also possible to cipher the digital work before a distribution. If it is ciphered, information for encryption, in other words, encoding information or encryption information is added at the beginning or the end of digital data as control information for a header or a trailer. As described above, the registration procedure in Steps ① to ④ in FIG. 6 corresponds to the registration procedure in Step ① in FIGS. 1 and 2.

After receiving the registration of the digital work (Steps ① to ④ in FIG. 6), the C-DRC encapsulates (ciphers) the digital work, registers it as transmission master information in the rights registration database 14 (FIGS. 1 and 2), and starts a distribution to the user (Step ⑤ in FIG. 6). In this invention, it is also possible to omit the encapsulation (encryption) before the distribution and it is included in this invention. The C-DRC sends the transmission master information also to the wwDRC and registers it at the wwDRC (Step ⑥ in FIG. 6).

The B-DRC sells digital contents (works) distributed from the C-DRC (Step ⑦ in FIG. 6). In other words, the user tries the work (unauthorized work at this time) supplied from the B-DRC, and if the user requires to purchase the work, he or she can obtain a grant of the license in the procedure shown in FIGS. 1 and 2 (Step ⑧ in FIG. 6). If the digital work is encapsulated (ciphered), the user tries the work within an audition range (an audition time, an audition count, etc.) inputted in Step ② in FIG. 6. If he or she requires to purchase the work, the C-DRC issues a key (a decoding key) for defrosting the capsule under predetermined conditions such as a payment of a fee to the user on the basis of an application for a license from the user.

In the present invention, as described above, the digital rights center (DRC) issues a license after receiving a utilization license grant application and adds a license including an identification code ID of a device to be used by a user to a digital work by means of a digital watermark. Accordingly, it becomes possible to monitor whether or not a use of a digital work is fair by checking a presence or an absence of a license of a digital work which has been used or by deciphering the license. With an arrangement of a system which can be monitored as described above, it becomes possible to prevent or restrains unfair use such as copying or alteration of digital works.

In this system, it is possible to incorporate an accounting system for checking a payment of a use fee. For example, if the digital rights center (DRC) judges that there is no grant information registered for the device in which a digital work is used as a result of deciphering the license, a user can be requested to pay the use fee and a license will be granted after his or her payment is checked. Unless the user pays the fee in spite of the payment request, it is preferable to send a warning to the user.

A new license can be added (including writing side by side) so that the contents of an old license can be read. If so, it is possible to check a history of use of the digital work retroactively so as to be convenient. In this method, however, a quality of the work (an image quality or a sound quality) is deteriorated every time a new license is added. To prevent the quality deterioration, it is preferable to use a method of deleting the old license and adds a new license.

In the digital work utilization monitoring system according to the present invention, an encoder is arranged in the digital work recording and reproducing unit of a user device, and the digital rights center checks that the use is granted based on an identification code of the work output by the encoder and an identification code of the digital work recording and reproducing unit used by the user; if a use of the digital work is newly granted, a license is issued.

In this case, an accounting system can be incorporated so that a license can be issued to the digital work recording and reproducing unit of a new user under the condition that a use fee has been paid. In accordance with further aspect of the present invention, there is provided a specific utilization monitoring system with which the accounting system is combined.

The digital work recording and reproducing unit of the user device can be formed by a computer (a personal computer, PC, etc.). If so, computers of a plurality of users may be connected to the digital rights center (DRC) via an information network (a computer network). The information network may be the Internet.

A plurality of the digital rights centers (DRCs) may be arranged and be connected with each other via an information network. In this condition, digital works can be easily transferred among different DRCs and a digital work market is expanded, by which a circulation of the digital works can be further promoted. Preferably, the plurality of DRCs are located in different areas in the proportion of a single DRC to a single area. It is because a management per area is facilitated.

In addition, it is appropriate to classify a plurality of DRCs and to divide functions to those for respective classes for achieving a smooth management of the entire system. For example, the DRCs are classified into a world wide or supervisory DRC, a plurality of country or area DRCs, and a plurality of terminal or business DRCs. In this condition, preferably a single area DRC is arranged for each country. Further, with a distribution and accounting processing of digital works among the area DRCs always performed via the world wide DRC, their management is unified so as to facilitate a smooth circulation and order maintaining. In addition, an arrangement of a single area or regional DRC per country facilitates a management and accounting processing of digital works in each country.

According to the present invention, there is provided a recording unit for recording a digital work with a license in a separate and movable record medium such as a CD-ROM. Furthermore, in accordance with another aspect of the present invention, a digital work with a license issued for a specific user cannot be reproduced in a reproducing unit of a user other than the specific user, by which the digital work can be reliably prevented from being illegally used.

What is claimed is:

1. A method of monitoring use of digital works, comprising the steps of:
   (a) registering a digital work in a rights registration database according to an identification code of the digital work;
   (b) receiving an application of permission for a use of the digital work, together with the identification code of the digital work used by a user and an identification code of a user device;
   (c) collating the identification code of the digital work and the identification code of the user device with said rights registration database on the basis of the application of the permission for using the digital work and, if the permission for using the digital work is granted, issuing a license including the identification code of the user device; and
   (d) embedding the license in the digital work by means of a digital watermark so that the user can use the digital work with the license in the user device.

2. The method of monitoring use of digital works according to claim 1, further comprising checking whether a use fee has been paid from the user device before issuing the license, if utilization permission information is not registered for the user device regarding the identification code of the digital work as a result of the collation in said step (c).

3. The method of monitoring use of digital works according to claim 2, further comprising sending a warning to the user device, when the utilization permission information is not registered for the user device regarding the identification code of the digital work as a result of the collation in said step (c) and a use fee has not been paid from the user device.

4. The method of monitoring use of digital works according to claim 1, wherein a plurality of licenses sequentially granted to an identical digital work are added to the digital work in order so that the licenses can be deciphered retroactively.

5. The method of monitoring use of digital works according to claim 1, wherein a plurality of licenses sequentially granted to an identical digital work are renewed every time.

6. A system for monitoring use of digital works, comprising:
   a rights registration database for registering a digital work and a user device with identification codes, the use device being used by a user for recording and reproducing the digital work;
   a user-side encoder, comprising:
      an application sending section, arranged in the user device, for sending an application of permission for a use of a digital work with work and device identification codes, the work identification code being an identification code of the digital work used in said user device, and the device identification code being an identification code of said user device, and
      a license embedding section for embedding a license including said device identification code into the digital work by means of a digital watermark on the basis of a license grant instruction; and a digital rights center comprising:
- an application receiving server for receiving said work and device identification codes from said application sending section and for collating said work and device identification codes with said rights registration database, and
- a license issuing server for sending the license grant instruction granting the license including said device identification code to said license embedding section if the utilization permission is granted.

7. The system for monitoring use of digital works according to claim 6, further comprising an accounting system, wherein said accounting system sends an instruction of granting a license to said license issuing server on condition that a use fee has been already paid, if the device identification code is not registered for the work identification code as a result of collating the both work and device identification codes with said rights registration database.

8. The system for monitoring use of digital works according to claim 7, further comprising an accounting database, wherein said user-side encoder further has a payment processing section and said digital rights center has an accounting server;

wherein said application receiving server outputs a final application request instruction to said payment processing section if the device identification code of the user device is not registered for the work identification code of the digital work as a result of collating both work and device identification codes with said rights registration database;

wherein the payment processing section performs the final application to said accounting server according to the final application request instruction and perform the payment processing of a use fee via said accounting system; and wherein, when the final application and the payment of the use fee have been completed, said accounting server instructs the license issuing server to issue the license to the user device, stores the processing result into said rights registration database, and stores the accounting information into said accounting database.

9. The system for monitoring use of digital works according to claim 6, wherein the user device is formed by a computer and computers of a plurality of users are connected to the digital rights center via an information network.

10. The system for monitoring use of digital works according to claim 9, wherein the information network is the Internet.

11. The system for monitoring use of digital works according to claim 6, comprising a plurality of digital rights centers, wherein these digital rights centers are connected to each other via the information network.

12. The system for monitoring use of digital works according to claim 11, wherein a single digital rights center is arranged for each area.

13. The system for monitoring use of digital works according to claim 11, wherein the plurality of digital rights centers are classified into a supervisory digital rights center, a plurality of area digital rights centers each of which is arranged in each area and is controlled by the supervisory digital rights center, and terminal digital rights centers under control of each area digital rights center.

14. The system for monitoring use of digital works according to claim 13, wherein each area digital rights center is arranged for each country.

15. The system for monitoring use of digital works according to claim 13, wherein each area digital rights center includes an accounting system so that the area digital rights center in each area performs accounting processing in the area while the supervisory digital rights center performs a distribution and accounting processing of the digital work between different areas.

16. The digital work recording unit for use in the system for monitoring use of digital works according to claim 6, the digital work recording unit comprising:
- a user-side encoder including the application sending section and the license embedding section; and
- a recording section for recording a digital work with a license embedded by means of a digital watermark into a detachable storage medium.

17. A digital work reproducing unit used together with the digital work recording unit according to claim 16, the digital work reproducing unit comprising:
- a reproducing section for reading a content recorded in the storage medium; and
- a protector, including a previously stored identification code of said digital work recording unit, for inhibiting an output of the digital work read by said reproducing section, if the license added to the digital work read by said reproducing section does not match the identification code of said digital work recording unit.

* * * * *